(12) United States Patent
Kumar et al.

(10) Patent No.: US 10,395,115 B2
(45) Date of Patent: Aug. 27, 2019

(54) SYSTEMS, DEVICES, AND METHODS FOR ROBOTIC REMOTE SENSING FOR PRECISION AGRICULTURE

(71) Applicant: The Trustees of the University of Pennsylvania, Philadelphia, PA (US)

(72) Inventors: R. Vijay Kumar, Wilmington, DE (US); Gareth Benoit Cross, Belmont, CA (US); Chao Qu, Philadelphia, PA (US); Jnaneshwar Das, Philadelphia, PA (US); Anurag Makineni, San Jose, CA (US); Yash Shailesh Mulgaonkar, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 15/545,266

(22) PCT Filed: Jan. 27, 2016

(86) PCT No.: PCT/US2016/015093
§ 371 (c)(1),
(2) Date: Jul. 20, 2017

(87) PCT Pub. No.: WO2016/123201
PCT Pub. Date: Aug. 4, 2016

(65) Prior Publication Data
US 2017/0372137 A1    Dec. 28, 2017

Related U.S. Application Data

(60) Provisional application No. 62/108,509, filed on Jan. 27, 2015.

(51) Int. Cl.
*H04N 7/18*         (2006.01)
*G06K 9/00*         (2006.01)
(Continued)

(52) U.S. Cl.
CPC .......... *G06K 9/00657* (2013.01); *G06T 17/05* (2013.01); *H04N 5/332* (2013.01);
(Continued)

(58) Field of Classification Search
CPC ........ B64C 2201/027; B64C 2201/108; B64C 2201/141; B64C 39/024; B64C 39/028;
(Continued)

(56) References Cited

U.S. PATENT DOCUMENTS 5,414,631 A    5/1995  Denoize et al.
6,278,945 B1   8/2001  Lin
(Continued)

FOREIGN PATENT DOCUMENTS

AU    2013293507 B2    3/2017
CN     101109640 A     1/2008
(Continued)

OTHER PUBLICATIONS

Applicant-Initiated Interview Summary for U.S. Appl. No. 15/218,938 (dated Nov. 3, 2017).
(Continued)

*Primary Examiner* — Anner N Holder
(74) *Attorney, Agent, or Firm* — Jenkins, Wilson, Taylor & Hunt, P.A.

(57) ABSTRACT

The present subject matter relates to systems, devices, and methods for data-driven precision agriculture through close-range remote sensing with a versatile imaging system. This imaging system can be deployed onboard low-flying unmanned aerial vehicles (UAVs) and/or carried by human scouts. Additionally, the present technology stack can include methods for extracting actionable intelligence from the rich datasets acquired by the imaging system, as well as visualization techniques for efficient analysis of the derived data products. In this way, the present systems and methods can help specialty crop growers reduce costs, save resources, and optimize crop yield.

17 Claims, 12 Drawing Sheets

(51) Int. Cl.
*H04N 13/25* (2018.01)
*H04N 13/282* (2018.01)
*H04N 5/33* (2006.01)
*G06T 17/05* (2011.01)

(52) U.S. Cl.
CPC ............ *H04N 7/185* (2013.01); *H04N 13/25* (2018.05); *H04N 13/282* (2018.05); *Y02A 40/12* (2018.01)

(58) Field of Classification Search
CPC .... G01C 21/165; G01C 21/20; G01C 21/206; G01S 19/48; G05D 1/102
See application file for complete search history.

(56) References Cited

U.S. PATENT DOCUMENTS

| | | | |
|---|---|---|---|
| 6,308,911 B1 | 10/2001 | Schroeder | |
| 6,422,508 B1* | 7/2002 | Barnes | F41G 3/14 |
| | | | 244/3.15 |
| 7,249,730 B1 | 7/2007 | Flippen, Jr. | |
| 7,289,906 B2 | 10/2007 | van der Merwe et al. | |
| 8,019,544 B2 | 9/2011 | Needelman et al. | |
| 8,380,362 B2 | 2/2013 | Beavin | |
| 8,577,539 B1 | 11/2013 | Morrison et al. | |
| 8,676,498 B2 | 3/2014 | Ma et al. | |
| 8,756,001 B2 | 6/2014 | Georgy et al. | |
| 9,031,809 B1 | 5/2015 | Kumar et al. | |
| 9,104,201 B1 | 8/2015 | Pillai et al. | |
| 9,129,355 B1* | 9/2015 | Harvey | G06T 7/0008 |
| 9,265,187 B2* | 2/2016 | Cavender-Bares | A01C 7/00 |
| 9,488,480 B2 | 11/2016 | Georgy et al. | |
| 9,568,321 B2 | 2/2017 | Bharadwaj et al. | |
| 9,599,993 B2 | 3/2017 | Kumar et al. | |
| 10,037,028 B2 | 7/2018 | Loianno et al. | |
| 2003/0182077 A1 | 9/2003 | Emord | |
| 2004/0264761 A1* | 12/2004 | Mas | G06K 9/00664 |
| | | | 382/154 |
| 2005/0251328 A1 | 11/2005 | Merwe et al. | |
| 2006/0015247 A1 | 1/2006 | Speer | |
| 2007/0032951 A1 | 2/2007 | Tanenhaus et al. | |
| 2007/0235592 A1 | 10/2007 | Horn et al. | |
| 2008/0125896 A1 | 5/2008 | Troy et al. | |
| 2008/0144925 A1* | 6/2008 | Zhu | G06K 9/32 |
| | | | 382/154 |
| 2008/0195316 A1 | 8/2008 | Krishnaswamy | |
| 2009/0256909 A1 | 10/2009 | Nixon | |
| 2009/0290811 A1 | 11/2009 | Imai | |
| 2010/0084513 A1 | 4/2010 | Gariepy et al. | |
| 2010/0114408 A1 | 5/2010 | Goossen | |
| 2011/0029235 A1 | 2/2011 | Berry | |
| 2011/0082566 A1 | 4/2011 | Herr et al. | |
| 2012/0078510 A1 | 3/2012 | Ma et al. | |
| 2012/0101861 A1* | 4/2012 | Lindores | G06Q 10/06 |
| | | | 705/7.11 |
| 2012/0203519 A1 | 8/2012 | Louis et al. | |
| 2012/0221244 A1 | 8/2012 | Georgy et al. | |
| 2012/0245844 A1 | 9/2012 | Lommel et al. | |
| 2012/0256730 A1 | 10/2012 | Scott et al. | |
| 2012/0286991 A1 | 11/2012 | Chen et al. | |
| 2013/0124020 A1 | 5/2013 | Duggan et al. | |
| 2013/0131908 A1 | 5/2013 | Trepagnier et al. | |
| 2013/0176423 A1 | 7/2013 | Rischmuller et al. | |
| 2013/0325346 A1 | 12/2013 | McPeek | |
| 2014/0008496 A1 | 1/2014 | Ye et al. | |
| 2014/0032167 A1 | 1/2014 | Mayer et al. | |
| 2014/0099853 A1 | 4/2014 | Condon et al. | |
| 2014/0119716 A1* | 5/2014 | Ohtomo | G01C 11/00 |
| | | | 396/8 |
| 2014/0138477 A1 | 5/2014 | Keennon et al. | |
| 2014/0152839 A1 | 6/2014 | Menon | |
| 2014/0263822 A1* | 9/2014 | Malveaux | B64C 39/024 |
| | | | 244/17.23 |
| 2014/0277847 A1 | 9/2014 | Cann et al. | |
| 2014/0278029 A1 | 9/2014 | Tonguz et al. | |
| 2014/0312165 A1* | 10/2014 | Mkrtchyan | B64D 47/08 |
| | | | 244/13 |
| 2014/0324253 A1 | 10/2014 | Duggan et al. | |
| 2014/0368663 A1* | 12/2014 | Pandey | H04N 5/23296 |
| | | | 348/169 |
| 2014/0372026 A1 | 12/2014 | Georgy et al. | |
| 2015/0025713 A1 | 1/2015 | Klinger et al. | |
| 2015/0039220 A1 | 2/2015 | Georgy et al. | |
| 2015/0149000 A1 | 5/2015 | Rischmuller et al. | |
| 2015/0304634 A1 | 10/2015 | Karvounis | |
| 2015/0321758 A1 | 11/2015 | Sarna, II | |
| 2016/0050840 A1* | 2/2016 | Sauder | A01B 79/005 |
| | | | 701/3 |
| 2016/0132052 A1 | 5/2016 | Seydoux et al. | |
| 2016/0139596 A1 | 5/2016 | Na et al. | |
| 2016/0200438 A1 | 7/2016 | Bokeno et al. | |
| 2016/0209236 A1 | 7/2016 | Steinhardt | |
| 2016/0214713 A1 | 7/2016 | Cragg | |
| 2016/0214715 A1 | 7/2016 | Meffert | |
| 2016/0216119 A1 | 7/2016 | Omr et al. | |
| 2017/0023937 A1 | 1/2017 | Loianno et al. | |
| 2017/0212529 A1 | 7/2017 | Kumar et al. | |
| 2018/0088597 A1 | 3/2018 | Shen | |

FOREIGN PATENT DOCUMENTS

| | | |
|---|---|---|
| CN | 101655561 A | 2/2010 |
| CN | 101676744 A | 3/2010 |
| CN | 104718508 B | 9/2017 |
| HK | 1210288 | 9/2018 |
| WO | WO 2014/018147 A2 | 1/2014 |
| WO | WO 2015/105597 A2 | 7/2015 |
| WO | WO 2017/095493 A2 | 6/2017 |

OTHER PUBLICATIONS

Final Office Action for U.S. Appl. No. 15/218,938 (dated Oct. 19, 2017).

Non-Final Office Action for U.S. Appl. No. 15/218,938 (dated Jun. 21, 2017).

Letter Regarding Decision to Grant for Chinese Application No. 201380034947.8 (dated Jun. 2, 2017).

Notification of Transmittal of the International Search Report and the Written Opinion of the International Searching Authority, or the Declaration for International Application No. PCT/US16/51313 (dated May 19, 2017).

Advisory Action and AFCP 2.0 Decision for U.S. Appl. No. 15/218,938 (dated Apr. 14, 2017).

Non-Final Office Action for U.S. Appl. No. 15/165,846 (dated Feb. 23, 2017).

Final Office Action for U.S. Appl. No. 15/218,938 (dated Feb. 3, 2017).

Letter regarding the second Office Action for Chinese Patent Application No. 201380034947.8 (dated Jan. 26, 2017).

Notice of Acceptance for Australian Patent Application No. 2013293507 (dated Nov. 30, 2016).

Notice of Allowance and Fee(s) Due for U.S. Appl. No. 14/397,761 (dated Oct. 4, 2016).

Non-Final Office Action for U.S. Appl. No. 15/218,938 (dated Sep. 29, 2016).

Communication of European publication number and information on the application of Article 67(3) EPC for European Patent Application No. 14878289.9 (dated Sep. 7, 2016).

Notification of First Office Action for Chinese Patent Application No. 201380034947.8 (dated Jun. 3, 2016).

European Search Report and Opinion for EP Application No. 13 823 648.4 (dated May 23, 2016).

Non-Final Office Action for U.S. Appl. No. 14/397,761 (dated Mar. 28, 2016).

Official Office Action for Australian Application No. 2013293507 (dated Feb. 4, 2016).

(56) References Cited

OTHER PUBLICATIONS

Commonly assigned, co-pending PCT International Patent Application No. PCT/US2016/015093 titled, "Systems, Devices, and Methods for Robotic Remote Sensing for Precision Agriculture," (unpublished, filed Jan. 27, 2016).
Wagner et al., "Subdimensional expansion for multirobot path planning," Artificial Intelligence, vol. 219, pp. 1-24, (2015).
Commonly assigned, co-pending U.S. Appl. No. 62/217,301 titled, "Systems and Methods for Generating Safe Trajectories for Multi-Vehicle Teams," (unpublished, filed Sep. 11, 2015).
Notification of Transmittal of the International Search Report and the Written Opinion of the International Searching Authority, or the Declaration for International Application No. PCT/US2014/067822 (dated Aug. 7, 2015).
Commonly assigned U.S. Appl. No. 62/196,762 titled, "Systems, Devices, and Methods for On-Board Sensing and Control of Micro Aerial Vehicles," (unpublished, filed Jul. 24, 2015).
Communication of European publication number and information on the application of Article 67 (3) EPC for Application No. 13823648.4 (dated Feb. 11, 2015).
Shen et al., "Tightly-coupled monocular visual-inertial fusion for autonomous flight of rotorcraft MAVs," IEEE Intl. Conf. on Robot. and Autom., Seattle, Washington, USA (2015).
Goldenberg et al., Enhanced partial expansion A*, Journal of Artificial Intelligence Research, vol. 50, No. 1, pp. 141-187 (2014).
Notification of Transmittal of the International Search Report and the Written Opinion of the International Searching Authority, or the Declaration for International Application No. PCT/US2013/038769 (dated Jan. 17, 2014).
Hesch et al., "Camera-imu-based localization: Observability analysis and consistency improvement," The Intl. Journal of Robotics Research, vol. 33, No. 1, pp. 182-201 (2014).
Thomas et al., "Toward Image Based Visual Servoing for Aerial Grasping and Perching," IEEE Intl. Conf. on Robot. and Autom., Hong Kong, China, pp. 2113-2118 (2014).
Specht E., "The best known packings of equal circles in a square," http://hydra.nat.uni-magdeburg.de/packing/csq/csq.html (Oct. 2013).
Yu et al., "Planning optimal paths for multiple robots on graphs," in Proceedings of 2014 IEEE International Conference on Robotics and Automation (ICRA), pp. 3612-3617, (2013).
Martinelli, "Visual-inertial structure from motion: Observability and resolvability," IEEE/RSJ Intl. Conf. on Intell. Robots and Systems (IROS 2013), pp. 4235-4242 (Nov. 2013).
Schmid et al., "Stereo vision based indoor/outdoor navigation for flying robots," Proc. of the IEEE/RSJ Intl. Cozzi: on Intell. Robots and Syst., Tokyo, Japan, pp. 1-8 (Nov. 2013).
Lynen et al., "A robust and modular multi-sensor fusion approach applied to MAV navigation," Proc. of the IEEE/RSJ Intl. Conf. on Intell. Robots and Syst., Tokyo, Japan, pp. 1-7 (Nov. 2013).
"Kalman filter," Wikipedia, pp. 1-31 http://en.wikipedia.org/wiki/Kalman_filter (page last modified May 24, 2016).
Richter et al., "Polynomial trajectory planning for quadrotor flight," Proc. of the IEEE Intl. Conf on Robot. and Autom., Karlsruhe, Germany, pp. 1-8 (May 2013).
Shen et al., "Vision-based state estimation and trajectory control towards high-speed flight with a quadrotor," Proc. of Robot.: Sci. and Syst., Berlin, Germany, pp. 1-8 (May 2013).
Shen et al., "Vision-based state estimation for autonomous rotorcraft MAVs in complex environments," Proc. of the IEEE Intl. Conf. on Robot. and Autom., Karlsruhe, Germany, pp. 1-7 (May 2013).
Li et al., "Real-time motion tracking on a cellphone using inertial sensing and a rolling-shutter camera," IEEE International Conference on Robotics and Automation, pp. 4712-4719 (May 2013).
Lee et al., "Nonlinear Robust Tracking Control of a Quadrotor UAV on SE(3)," Asian Journal of Control, vol. 15, No. 2, pp. 391-408 (May 2013).
Zou et al., "CoSLAM: Collaborative visual SLAM in dynamic environments," IEEE Transactions on Pattern Analysis Machine Intelligence, vol. 35, No. 2, pp. 354-366 (2013).
De Wilde et al,. "Push and Rotate: Cooperative Multi-Agent Path Planning," Proceedings of the 2013 International Conference on Autonomous Agents and Multi-agent Systems (AAMAS), p. 87-94 (2013).
Forster et al., "Collaborative monocular SLAM with multiple Micro Aerial Vehicles," IEEE/RSJ Conference on Intelligent Robots and Systems, Tokyo, Japan (2013).
Turpin et al., "CAPT: Concurrent assignment and planning of trajectories for multiple robots," The International Journal of Robotics Research 2014, vol. 33(1) p. 98-112 (2013).
Turpin et al., "Trajectory Design and Control for Aggressive Formation Flight with Quadrotors," Autonomous Robots, vol. 33, pp. 143-156 (Feb. 10, 2012).
Ozaslan et al., "Inspection of Penstocks and Featureless Tunnel-like Environments using Micro UAVs," Field and Service Robotics Conference (FSR), Brisbane, Australia, pp. 123-136 (2013).
Schmid et al., "Towards autonomous MAV exploration in cluttered indoor and outdoor environments," RSS 2013 Workshop on Resource-Eficient Integration of Perception, Control and Navigation for Micro Air Vehicles (MAVs), Berlin, Germany (2013).
Sucan et al., "The Open Motion Planning Library," IEEE Robot. Autom. Mag., vol. 19, No. 4, pp. 72-82 http://ompl.kavrakilab.org (Dec. 2012).
Shen et al., "State Estimation for Indoor and Outdoor Operation with a Micro-Aerial Vehicle," International Symposium on Experimental Robotics (ISER), pp. 1-15 (2012).
Fraundorfer et al., "Vision-based autonomous mapping and exploration using a quadrotor MAV," Proc. of the IEEE/RSJ Intl. Conf on bztell. Robots and Syst., Vilamoura, Algarve, Portugal, pp. 1-8 (Oct. 2012).
Ayanian et al., "Decentralized multirobot control in partially known environments with dynamic task reassignment," IFAC Workshop on Distributed Estimation and Control in Networked Systems, Santa Barbara, CA, pp. 311-316 (Sep. 2012).
Scherer et al., "River mapping from a flying robot: state estimation, river detection, and obstacle mapping," Auton. Robots, vol. 33, No. 1-2, pp. 189-214 (Aug. 2012).
Kottas et al., "On the consistency of vision-aided inertial navigation," Proc. of the Intl. Sym. on Exp. Robot., Quebec, Canada, pp. 1-15 (Jun. 2012).
Weiss et al., "Real-time onboard visual-inertial state estimation and self-calibration of mays in unknown environments," Proc. of the IEEE Intl. Conf on Robot. and Autom., Saint Paul, Mn, pp. 957-964 (May 2012).
De Croon et al., "Sub-sampling: Real-time vision for micro air vehicles," Robot. and Autom. Syst., vol. 60, No. 2, pp. 167-181 (Feb. 2012).
Turpin et al., "Trajectory design and control for aggressive formation flight with quadrotors," Autonomous Robots, vol. 33, pp. 143-156 (Feb. 2012).
Forte et al., "Impedance Control of an Aerial Manipulator," American Control Conference (ACC), Montreal, Canada, pp. 3839-3844 (2012).
Michael et al., "Collaborative mapping of an earthquake-damaged building via ground and aerial robots," Journal of Field Robotics, vol. 29, No. 5, pp. 832-841 (2012).
Shen et al., "Autonomous indoor 3D exploration with a Micro-Aerial Vehicle," IEEE Intl. Conf. on Robot. and Autom., St. Paul, Minnesota, USA, pp. 9-15 (2012).
Tomic et al., "Toward a Fully Autonomous UAV: Research platform for indoor and outdoor urban search and rescue," IEEE Robot. Autom. Mag., vol. 19, No. 3, pp. 46-56 (2012).
Kushleyev et al., "Planning for landing site selection in the aerial supply delivery," Proc. of the IEEE/RSJ Intl. Conf on Intell. Robots and Syst., San Francisco, CA, pp. 1146-1153 (Sep. 2011).
Michael et al., "Control of ensembles of aerial robots," Proc. of the IEEE, vol. 99, No. 9, pp. 1587-1602 (Sep. 2011).
Huang et al., "Visual odometry and mapping for autonomous flight using an RGB-D camera," Proc. of the Intl. Spit. of Robot. Research, Flagstaff, AZ, pp. 1-16 (Aug. 2011).
Bills et al., "Autonomous MAV flight in indoor environments using single image perspective cues," Proc. of the IEEE Intl. Conf. on Robot, and Autom., Shanghai, China, pp. 5776-5783 (May 2011).

(56) References Cited

OTHER PUBLICATIONS

Mellinger et al., "Minimum Snap Trajectory Generation and Control for Quadrotors," IEEE International Conference on Robotics and Automation, pp. 2520-2525 (May 2011).
Kuemmerle et al., "g2o: A general framework for graph optimization," Proc. of the IEEE Intl. Conf. on Robot. and Autom., Shanghai, China, pp. 3607-3613 (May 2011).
Shen et al., "Autonomous multi-floor indoor navigation with a computationally constrained MAV," Proc. of the IEEE Intl. Conf on Robot. and Autom., Shanghai, China, pp. 20-25 (May 2011).
De Vries et al., "Cooperative Control of Swarms of Unmanned Aerial Vehicles," 49th AIAA Aerospace Sciences Meeting including the New Horizons Forum and Aerospace Exposition, pp. 1-23 (Jan. 2011).
Jones et al., "Visual-inertial navigation, mapping and localization: A scalable real-time causal real-time causal approach," International Journal of Robotics Research, pp. 1-38 (Jan. 2011).
Michael et al., "Cooperative manipulation and transportation with aerial robots," Auton. Robots, vol. 30, No. 1, pp. 73-86 (Jan. 2011).
Grzonka et al., "A fully autonomous indoor quadrotor," IEEE Trans. Robot., vol. PP, No. 99, pp. 1-11 (2011).
Bachrach et al., "RANGE-robust autonomous navigation in GPS-denied environments," J. Field Robotics, vol. 28, No. 5, pp. 644-666 (2011).
Weiss et al., "Monocular-SLAM-based navigation for autonomous micro helicopters in GPS denied environments," Journal of Field Robotics, vol. 28, No. 6, pp. 854-874 (2011).
Lee et al., "Geometric tracking control of a quadrotor UAV on SE(3)," Proc. of the Intl. Conf. on Decision and Control, Atlanta, GA, pp. 5420-5425 (Dec. 2010).
Mellinger et al., "Trajectory generation and control for precise aggressive maneuvers," Intl. Symposium on Experimental Robotics (Dec. 2010).
Alonso-Mora et al., "Optimal reciprocal collision avoidance for multiple non-holonomic robots," Proceedings of the 10th International Symposium on Distributed Autonomous Robotic Systems (DARS), Berlin, Springer Press (Nov. 2010).
Mellinger et al., "Cooperative grasping and transport using multiple quadrotors," Intl. Symposium on Distributed Autonomous Systems, Lausanne, Switzerland (Nov. 2010).
Michael et al., "The Grasp Multiple Micro UAV Test Bed," IEEE Robotics and Automation Magazine, vol. 17, No. 3, pp. 56-65 (Sep. 2010).
Kelly et al., "Visual-inertial sensor fusion: Localization, mapping and sensor-to-sensor self-calibration," pp. 1-53 (Aug. 2010).
Carlson, "Mapping large urban environments with GPS-aided SLAM," Ph.D. dissertation, CMU, Pittsburgh, PA, pp. 1-122 (Jul. 2010).
Mei et al., "RSLAM: A system for large-scale mapping in constant-time using stereo," Intl J. of Computer Vision, pp. 1-17 (Jun. 2010).
Strasdat et al., "Scale drift-aware large scale monocular SLAM," Proc. of Robot.: Sci. and Syst., Zaragoza, Spain, pp. 1-8 (Jun. 2010).
Karaman et al., "Incremental sampling-based algorithms for optimal motion planning," Proc. of Robot.: Sci. and Syst., Zaragoza, Spain pp. 1-8 (Jun. 2010).
Gillula et al., "Design of guaranteed safe maneuvers using reachable sets: Autonomous quadrotor aerobatics in theory and practice," Proc. of the IEEE Intl. Conf. on Robotics and Automation, pp. 1649-1654, Anchorage, AK (May 2010).
Lupashin et al., "A simple learning strategy for high-speed quadrocopter multi-flips," Proc. of the IEEE Intl. Conf. on Robot. and Autom., pp. 1642-1648, Anchorage, AK (May 2010).
Oung et al., "The distributed flight array," Proc. of the IEEE Intl. Conf. on Robotics and Automation, pp. 601-607, Anchorage, AK (May 2010).
He et al., "On the design and use of a micro air vehicle to track and avoid adversaries," The International Journal of Robotics Research, vol. 29, pp. 529-546 (2010).

Oh, "Multisensor Fusion for Autonomous Uav Navigation Based on the Unscented Kalman Filter with Sequential Measurement Updates," IEEE International Conference on Multisensor Fusion and Integration for Intelligent Systems, pp. 217-222 (Sep. 2010).
Bachrach et al., "Autonomous flight in unknown indoor environments," International Journal of Micro Air Vehicles, vol. 1, No. 4, pp. 217-228 (Dec. 2009).
Fink et al., "Planning and control for cooperative manipulation and transportation with aerial robots," Proceedings of the Intl. Symposium of Robotics Research, Luzern, Switzerland (Aug. 2009).
Tedrake, "LQR-Trees: Feedback motion planning on sparse randomized trees," Proceedings of Robotics: Science and Systems, Seattle, WA (Jun. 2009).
Moore et al., "Simultaneous local and global state estimation for robotic navigation," Proc. of the IEEE Intl. Conf. on Robot. and Autom., Kobe, Japan, pp. 3794-3799 (May 2009).
Schleicher et al., "Real-time hierarchical GPS aided visual SLAM on urban environments," Proc. of the IEEE Intl. Conf. on Robot. and Autom., Kobe, Japan, pp. 4381-4386 (May 2009).
Trawny et al., "Cooperative multi-robot localization under communication constraints," IEEE International Conference on Robotics and Automation, Kobe, Japan, pp. 4394-4400 (May 2009).
Esme, "Kalman Filter for Dummies," Bilgin's Blog, pp. 1-15, http://bilgin.esme.org/BitsBytes/KalmanFilterforDummies.aspx (Mar. 2009).
Bullo et al., Distributed Control of Robotic Networks: A Mathematical Approach to Motion Coordination Algorithms. Applied Mathematics Series, Princeton University Press (2009).
Klein et al., "Parallel Tracking and Mapping on a Camera Phone," International Symposium on Mixed and Augmented Reality (ISMAR), pp. 1-4 (2009).
van den Berg, "Reciprocal n-body collision avoidance," International Symposium on Robotics Research p. 3-19, (2009).
van den Berg et al., "Centralized path planning for multiple robots: Optimal decoupling into sequential plans," in Proceedings of Robotics: Science and Systems (RSS), (2009).
van den Berg J., "RVO2 library documentation," http://gamma.cs.unc.edu/RVO2/documentation/2.0/index.html (2008).
Civera et al., "Inverse depth parameterization for monocular SLAM," IEEE Trans. on Robot., vol. 24, No. 5, pp. 932-945 (Oct. 2008).
Wagner et al., "Robust and Unobtrusive Marker Tracking on Mobile Phones," International Symposium on Mixed and Augmented Reality (ISMAR), pp. 1-7 (Sep. 2008).
Kaess et al., "iSAM: Incremental smoothing and mapping," IEEE Trans. on Robot., manuscript, pp. 1-14 (Sep. 2008).
Kopfstedt et al., "Control of Formations of UAVs for Surveillance and Reconnaissance Missions," Proceedings of the 17th World Congress, The International Federation of Automatic Control, pp. 5161-5166 (Jul. 2008).
Olson, "Robust and efficient robotic mapping," Ph.D. dissertation, MIT, Cambridge, MA, pp. 1-10 (Jun. 2008).
Klein et al., "Parallel tracking and mapping for small AR workspaces," Proc. Sixth IEEE and ACM International Symposium on Mixed and Augmented Reality (ISMAR'07), Nara, Japan, pp. 1-10 (Nov. 2007).
Moreno-Noguer et al., "Accurate non-iterative 0(n) solution to the PnP problem," Proc. of the IEEE Intl. Conf on Computer Vision, Rio de Janeiro, Brazil, pp. 1-8 (Oct. 2007).
Tanner et al., "Flocking in fixed and switching networks," IEEE Trans. Autom. Control, vol. 52, No. 5, pp. 863-868 (May 2007).
Gurdan et al., "Energy-efficient autonomous four-rotor flying robot controlled at 1khz," Proceedings of the IEEE Intl. Conf. on Robotics and Automation, Roma, Italy (Apr. 2007).
Kloder et al., "Path planning for permutation-invariant multirobot formations," IEEE Transactions on Robotics, vol. 22, No. 4, pp. 650-665 (Aug. 2006).
Rosten et al., "Machine learning for high-speed corner detection," Proc. of the European Conf on Computer Vision, Graz, Austria, pp. 1-14 (May 2006).
Bay et al., "SURF: Speeded up robust features," Proc. of the European Conf on Computer Vision, Graz, Austria, pp. 1-14 (May 2006).

(56) References Cited

OTHER PUBLICATIONS

Schouwenaars et al., "Multi-vehicle path planning for non-line of sight communications," American Control Conference (2006).
Peng et al., "Coordinating multiple robots with kinodynamic constraints along specified paths," The International Journal of Robotics Research (IJRR), vol. 24, No. 4, pp. 295-310, (2005).
Hastings et al., "Optimization of large-scale, real-time simulations by spatial hashing," Proceedings of the 2005 Summer Computer Simulation Conference pp. 9-17 (2005).
Kamal et al., "Real Time Trajectory Planning for UAVs Using MILP," Proceedings of the 44th IEEE Conference on Decision and Control, and the European Control Conference 2005, pp. 3381-3386 (Dec. 2005).
Foxlin, "Pedestrian Tracking with Shoe-Mounted Inertial Sensors," Computer Graphics and Applications, vol. 25, No. 6, pp. 38-46 (Nov./Dec. 2005).
Van der Merwe et al., "Sigma-Point Kalman Filters for Integrated Navigation," Proc. of AIAA Guidance, Navigation, and Controls Conf., pp. 1-14 (Aug. 2004).
Howard et al., "Multi-robot mapping using manifold representations," IEEE International Conference on Robotics and Automation, New Orleans, Louisiana, pp. 4198-4203 (Apr. 2004).
Lowe, "Distinctive image features from scale-invariant keypoints," International Journal of Computer Vision, vol. 60, No. 2, pp. 91-110 (2004).
Schouwenaars et al., "Receding horizon path planning with implicit safety guarantees," American Control Conference, pp. 5576-5581 (2004).
Ansar et al., "Linear pose estimation from points or lines," IEEE Transactions on Pattern Analysis and Machine Intelligence, vol. 25, No. 5, pp. 1-12 (Apr. 2003).
Roumeliotis et al., "Stochastic cloning: A generalized framework for processing relative state measurements," Proc. of the IEEE Intl. Conf on Robot. and Autom., Washington, DC, pp. 1788-1795 (May 2002).
Desai et al., "Modeling and control of formations of nonholonomic mobile robots," IEEE Trans. Robot., vol. 17, No. 6, pp. 905-908 (Dec. 2001).
Egerstedt et al., "Formation constrained multi-agent control," IEEE Trans. Robot. Autom., vol. 17, No. 6, pp. 947-951 (Dec. 2001).
Beard et al., "A coordination architecture for spacecraft formation control," IEEE Trans. Control Syst. Technol., vol. 9, No. 6, pp. 777-790 (Nov. 2001).
Lefebvre et al., "Comment on 'A new method for the nonlinear transformation of means and covariances in filters and estimators'," IEEE Trans. Autom. Control, vol. 47, No. 8, pp. 1-10 (2001).
Richards et al., "Plume avoidance maneuver planning using mixed integer linear programming," AIAA Guidance, Navigation and Control Conference and Exhibit (2001).
Schouwenaars et al., "Mixed integer programming for multi-vehicle path planning," European Control Conference, pp. 2603-2608 (2001).
Welch et al., "An Introduction to the Kalman Filter," SIGGRAPH 2001, Course 8, pp. 1-47 (2001).
Tomlin et al., "Conflict resolution for air traffic management: a study in multi-agent hybrid systems," IEEE Transactions on Automatic Control, vol. 43, pp. 509-521, (1998).
Nieuwstadt et al., "Real-time trajectoryr generation tor idifrferentially flat systems," International Journal of Robust and Nonlinear Control, vol. 8, pp. 995-1020 (1998).
Julier et al., "A new extension of the kalman filter to nonlinear systems," Proc. of SPIE, I. Kadar, Ed., vol. 3068, pp. 182-193 (Jul. 1997).
Parrish et al., Animal Groups in Three Dimensions. Cambridge University Press, New York (1997).
Welch et al., "SCAAT: Incremental Tracking with Incomplete Information," University of North Carolina at Chapel Hill, pp. 1-12 (1997).
Buckley S., "Fast motion planning for multiple moving robots," Proceedings of the 1989 IEEE International Conference on Robotics and Automation (ICRA p. 322-326 (1989).

Smith et al., "Estimating uncertain spatial relationships in robotics," Proc. of the IEEE Intl. Conf. on Robot. and Autom., vol. 4, Raleigh, NC, pp. 167-193 (Mar. 1987).
Kant et al., "Toward efficient trajectory planning: The path-velocity decomposition," The International Journal of Robotics Research (IJRR), vol. 5, No. 3, pp. 72-89, (1986).
Erdmann et al., "On multiple moving objects," Algorithmica, vol. 2, pp. 1419-1424, (1986).
Lucas et al., "An iterative image registration technique with an application to stereo vision," Proc. of the 7th Intl. Joint Conf. on Artificial Intelligence, Vancouver, Canada, pp. 674-679 (Aug. 1981).
Maybeck, "Chapter 1 Introduction," Stochastic models, estimation, and control, vol. 1, pp. 1-16, Academic Press, Inc. (1979).
Hart et al., "A formal basis for the heuristic determination of minimum cost paths," IEEE Transactions on Systems Science and Cybernetics, vol. 4, No. 2, pp. 100-107, (Jul. 1968).
"Hummingbird quadrotor," Ascending Technologies, http://www.asctec.de/ (publication date unknown; downloaded from the internet May 25, 2016).
"Pelican quadrotor," Ascending Technologies, GmbH, http://www.asctec.de/ (publication date unknown; downloaded from the internet May 25, 2016).
Notification of Transmittal of the International Search Report and the Written Opinion of the International Searching Authority, or the Declaration for International Application No. PCT/US16/15093 (dated May 19, 2016).
Communication pursuant to Article 94(3) EPC for European Patent Application Serial No. 13 823 648.4 (dated Jul. 17, 2018).
Non-Final Office Action for U.S. Appl. No. 15/684,700 (dated Jul. 12, 2018).
Supplemental Notice of Allowability for U.S. Appl. No. 15/218,938 (dated Jul. 5, 2018).
Notice of Allowance and Fees Due for U.S. Appl. No. 15/218,938 (dated Mar. 26, 2018).
Advisory Action and AFCP 2.0 Decision for U.S. Appl. No. 15/218,938 (dated Feb. 1, 2018).
Communication under Rule 71(3) EPC Intention to Grant for European Patent Application Serial No. 14 878 289.9 (dated Sep. 19, 2018).
Notification of the First Office Action for Chinese Patent Application Serial No. 201480064737.8 (dated Sep. 5, 2018)
Xia et al., "In Situ 3D Segmentation of Individual Plant Leaves Using a RGB-D Camera for Agricultural Automation," Sensors, vol. 15, pp. 20463-20479 (Aug. 19, 2015).
Pourreza et al., "An optimum method for real-time in-field detection of Huanglongbing disease using a vision sensor," Computers and Electronics in Agriculture, vol. 110, pp. 221-232 (Jan. 2015).
"Citrus Greening Background," USDA APHIS, Available:https://www.aphis.usda.gov/wps/portal/aphis/ourfocus/planthealth?1dmy&urile=wcm:path:/aphis_content_library/sa_our_focus/sa_plant_health/sa_domestic_pests_and_diseases/sa_pests_and_diseases/sa_plant_disease/sa_citrus/ct_background, pp. 1-2 (2015).
"Press Release," CDFA Public Affairs, http://www.cdfa.ca.gov/egov/Press_Releases/Press_Release.asp?PRnum=15-031, pp. 1-2 (2015).
Das et al., "Devices, Systems, and Methods for Automated Monitoring enabling Precision Agriculture," IEEE International Conference on Automation Science and Engineering (CASE), pp. 1-8 (2015).
Solà, "Quaternion kinematics for the error-state Kalman filter," Institut de Robòtica i Informàtica Industrial, Tech. Rep., http://www.iri.upc.edu/people/jsola/JoanSola/objectes/notes/kinematics.pdf, pp. 1-70 (Sep. 12, 2016).
Gade et al., "Thermal Cameras and Applications: A Survey," Machine Vision and Applications, vol. 25, No. 1, pp. 245-262 (Jan. 2014).
Pourreza et al., "Citrus Huanglongbing Detection Using Narrow-Band Imaging and Polarized Illumination," Transactions of the ASABE, vol. 57, No. 1, pp. 259-272 (Jan. 2014).
Furgale et al., "Unified Temporal and Spatial Calibration for Multi-Sensor Systems," 2013 IEEE/RSJ International Conference on Intelligent Robots and Systems, pp. 1280-1286 (Nov. 3-7, 2013).

(56) References Cited

OTHER PUBLICATIONS

Tokekar et al., "Sensor planning for a symbiotic UAV and UGV system for precision agriculture," 2013 IEEE/RSJ International Conference on Intelligent Robots and Systems, pp. 5321-5326 (Nov. 3-7, 2013).

Arnó et al., "Leaf area index estimation in vineyards using a ground-based LiDAR scanner," Precision Agriculture, vol. 14, No.3, pp. 290-306 (Jun. 2013).

Shen et al., "Vision-Based State Estimation and Trajectory Control Towards High-Speed Flight with a Quadrator," Robotics: Science and Systems 2013, pp. 1-8 (Jun. 24-28, 2013).

Hornung et al., "OctoMap: An Efficient Probabilistic 3D Mapping Framework Based on Octrees," Autonomous Robots, vol. 34, No. 3, pp. 1-17 (2013).

El-Lissy, "APHIS Confirms Citrus Greening (Candidatus Liberibacter asiaticus) in Mission, Texas," USDA APHIS, pp. 1 (2013).

Gonzalez et al., "Characterization of leaf starch from HLB-affected and unaffected-girdled citrus trees," Physiological and Molecular Plant Pathology, vol. 79, pp. 71-78 (Jul. 2012).

Bergerman et al., "Results with autonomous vehicles operating in specialty crops," Robotics and Automation (ICRA), 2012 IEEE International Conference, pp. 1829-1835 (May 2012).

Furgale et al., "Continuous-Time Batch Estimation using Temporal Basis Functions," 2012 IEEE International Conference on Robotics and Automation, pp. 2088-2095 (May 14-18, 2012).

Weiss et al., "Plant Species Classification Using a 3D LIDAR Sensor and Machine Learning," Machine Learning and Applications (ICMLA), 2010 Ninth International Conference, pp. 339-345 (Dec. 2010).

Jaakkola et al., "A low-cost multi-sensoral mobile mapping system and its feasibility for tree measurements," ISPRS Journal of Photogrammetry and Remote Sensing, vol. 65, No. 6, pp. 514-522 (2010).

Bryson et al., "Airborne Vision-Based Mapping and Classification of Large Farmland Environments," Journal of Field Robotics, vol. 27, No. 5, pp. 1-40 (2010).
Techy et al., "Coordinated Aerobiological Sampling of a Plant Pathogen in the :Lower Atmosphere Using Two Autonomous Unmanned Aerial Vehicles," Journal of Field Robotics, vol. 27, No. 3, pp. 335-343 (2010).
Singh et al., "Comprehensive Automation for Specialty Crops: Year 1 results and lessons learned," Intelligent Service Robotics, vol. 3, No. 4, pp. 245-262 (2010).
Bakker et al., "Systematic design of an autonomous platform for robotic weeding," Journal of Terramechanics, vol. 47, No. 2, pp. 63-73 (2010).
Berni et al., "Thermal and Narrowband Multispectral Remote Sensing for Vegetation Monitoring From an Unmanned Aerial Vehicle," IEEE Transactions on Geoscience and Remote Sensing, vol. 47, No. 3, pp. 722-738 (Mar. 2009).
Cariou et al., "Automatic guidance of a four-wheel-steering mobile robot for accurate field operations," Journal of Field Robotics, vol. 26, No. 6-7, pp. 504-518 (2009).
Quigley et al., "ROS: an open-source Robot Operating System," ICRA Workshop on Open Source Software, vol. 3, No. 3.2, pp. 1-6 (2009).
Liew et al., "Signature optical cues: emerging technologies for monitoring plant health," Sensors, vol. 8, No. 5, pp. 3205-3239 (May 2008).
Zarco-Tejada et al., "A new era in remote sensing of crops with unmanned robots," SPIE Newsroom, pp. 2-4 (2008).

* cited by examiner

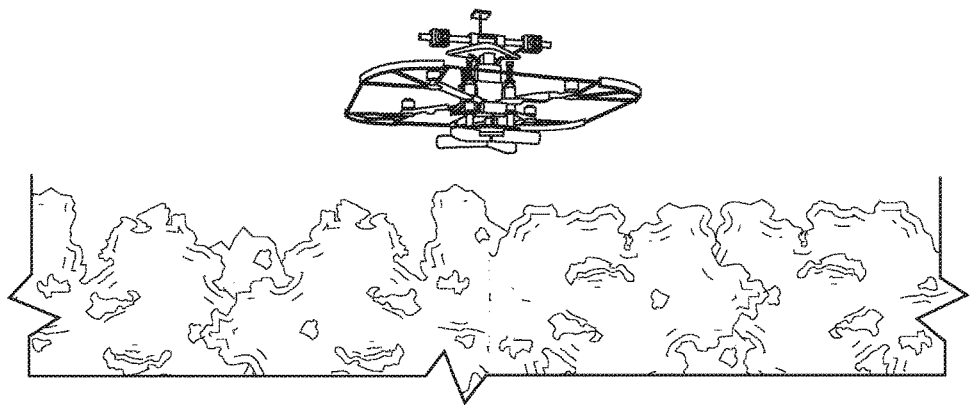
FIG. 4C
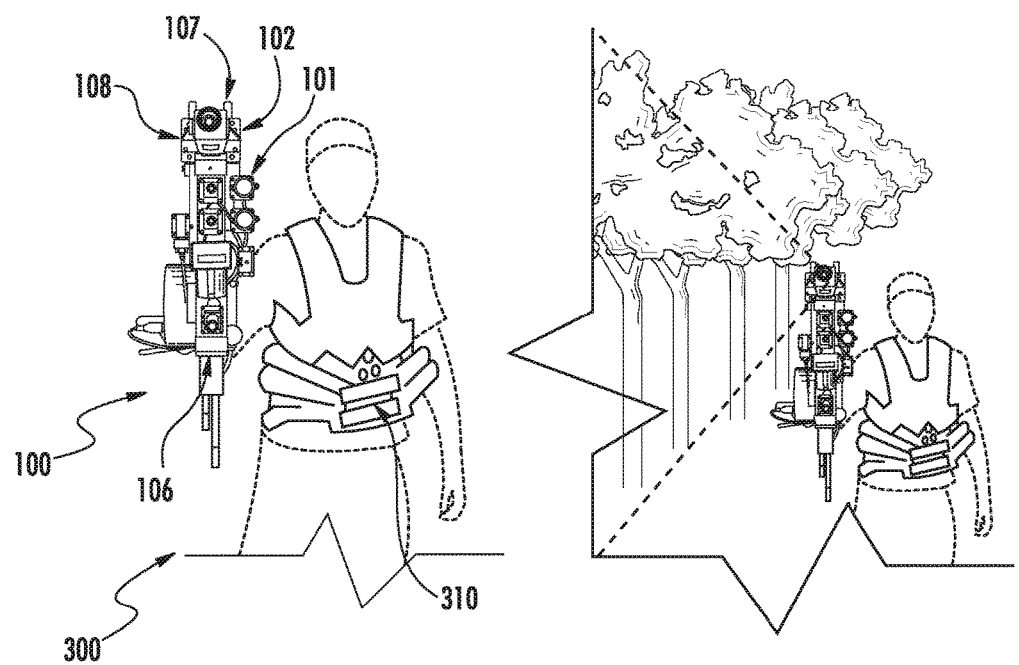
FIG. 4D
FIG. 4E

SYSTEMS, DEVICES, AND METHODS FOR ROBOTIC REMOTE SENSING FOR PRECISION AGRICULTURE

PRIORITY CLAIM

The present application claims the benefit of U.S. Provisional Patent Application Ser. No. 62/108,509, filed Jan. 27, 2015, the disclosure of which is incorporated herein by reference in its entirety.

GOVERNMENT INTEREST

This invention was made with government support under N00014-07-1-0829 awarded by the Office of Naval Research and under 1113830 awarded by the National Science Foundation. The government has certain rights in the invention.

TECHNICAL FIELD

This subject matter disclosed herein relates to systems and methods for data-driven remote sensing for precision agriculture. Specifically, the subject matter disclosed herein relates to the development of imaging systems and deployment modalities for close-range sensing of critical properties of specialty crops, such as apples, oranges, strawberries, peaches, and pecans.

BACKGROUND

Persistent and timely monitoring of agricultural farmlands have shown to be increasingly valuable to crop health and resource management. Remote sensing satellites and airborne sensing with winged aircrafts have allowed scientists to map large farmlands and forests through acquisition of multi-spectral imagery and 3-D structural data. However, data from these platforms lack the spatio-temporal resolution necessary for precision agriculture. For example, a typical remote sensing satellite image may have a pixel resolution of hundreds of meters, and airborne sensing may provide resolution of a few meters. It is desirable, however, to obtain data for monitoring orchard or vineyard health at a centimeter scale—a resolution at which stems, leaves, and fruits can be observed.

As a result, farm management tasks such as yield estimation and disease monitoring are primarily carried out through visual inspection by human scouts. Recent development in this area has resulted in imaging systems and data analysis methodologies to help automate some of these tasks (See, e.g., U.S. Patent Application Pub. No. 2013/0325346). For example, unmanned ground vehicles (UGVs) have been the first step towards automating the close-range monitoring of high-value crops. They can carry a variety of bulky sensors such as LiDAR for volumetric mapping, and ground penetrating radar (GPR) and electrical conductance sensors for precise soil mapping. Due to the mobility constraints of unstructured farms, however, it is infeasible to use UGVs for rapid and persistent monitoring. Additionally, ground vehicles are intrusive. Aerial platforms and hand-held sensors can alleviate some of the problems with using UGVs, but the available platforms for such systems are bulky and expensive, which can be prohibitive for large-scale deployments in farms. Furthermore, the spatio-temporal resolution of such systems are considered inadequate as discussed above.

Accordingly, it would be desirable to develop a portable, low-cost, compact, and lightweight imaging system along with agile deployment methodologies to help growers observe farms efficiently. As a part of this system, it can be advantageous to have a powerful data analysis and visualization framework to help growers interpret the acquired data.

SUMMARY

Disclosed herein is a methodology for data-driven precision agriculture through close-range remote sensing with a versatile imaging system, which may be deployed onboard low-flying unmanned aerial vehicles (UAVs), mounted to ground vehicles (e.g., unmanned ground vehicles (UGVs)), and/or carried by human scouts. Additionally, the present technology stack may include methods for extracting actionable intelligence from the rich datasets acquired by the imaging system, as well as visualization techniques for efficient analysis of the derived data products. The systems and methods discussed herein may include one or more of these four components: an imaging system, a deployment methodology, data analysis algorithms, and/or a visualization framework that, when used together, may help specialty crop growers to save resources (e.g., less fertilizers, water, and pesticides may be needed because of better stress and disease monitoring), optimize crop yield, and reduce costs (e.g., by allowing for a better allocation of labor due to the efficient estimation of crop yield and from the lower use of resources).

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which:

FIGS. 4a through 4c are bottom, side, and wide-angle views, respectively, of a multi-rotor UAV with the sensor suite facing downwards according to an embodiment of the presently disclosed subject matter;

FIG. 4d is a front view of a sensor suite harnessed on a human scout according to an embodiment of the presently disclosed subject matter;

FIG. 4e illustrates a harnessed sensor suite according to an embodiment of the presently disclosed subject matter being used to scan a row of dwarf apple trees at an apple orchard in Biglerville, Pa.;

FIG. 6b is a map showing canopy characteristics and scene features from the reconstruction shown in FIG. 6a;

DETAILED DESCRIPTION

Systems, devices, and methods for robotic remote sensing for precision agriculture disclosed herein address the limitations of current farm monitoring practices through the development of a technology stack for high-resolution multi-spectral 3-D mapping of specialty crops. The present subject matter exploits a versatile sensor suite capable of being deployed in multiple modalities (e.g., mounted onboard UAVs or UGVs, and/or carried by human scouts). The target applications include but are not limited to yield estimation and disease monitoring for apples, oranges, strawberries, peaches, and pecans.

Figure 1A:
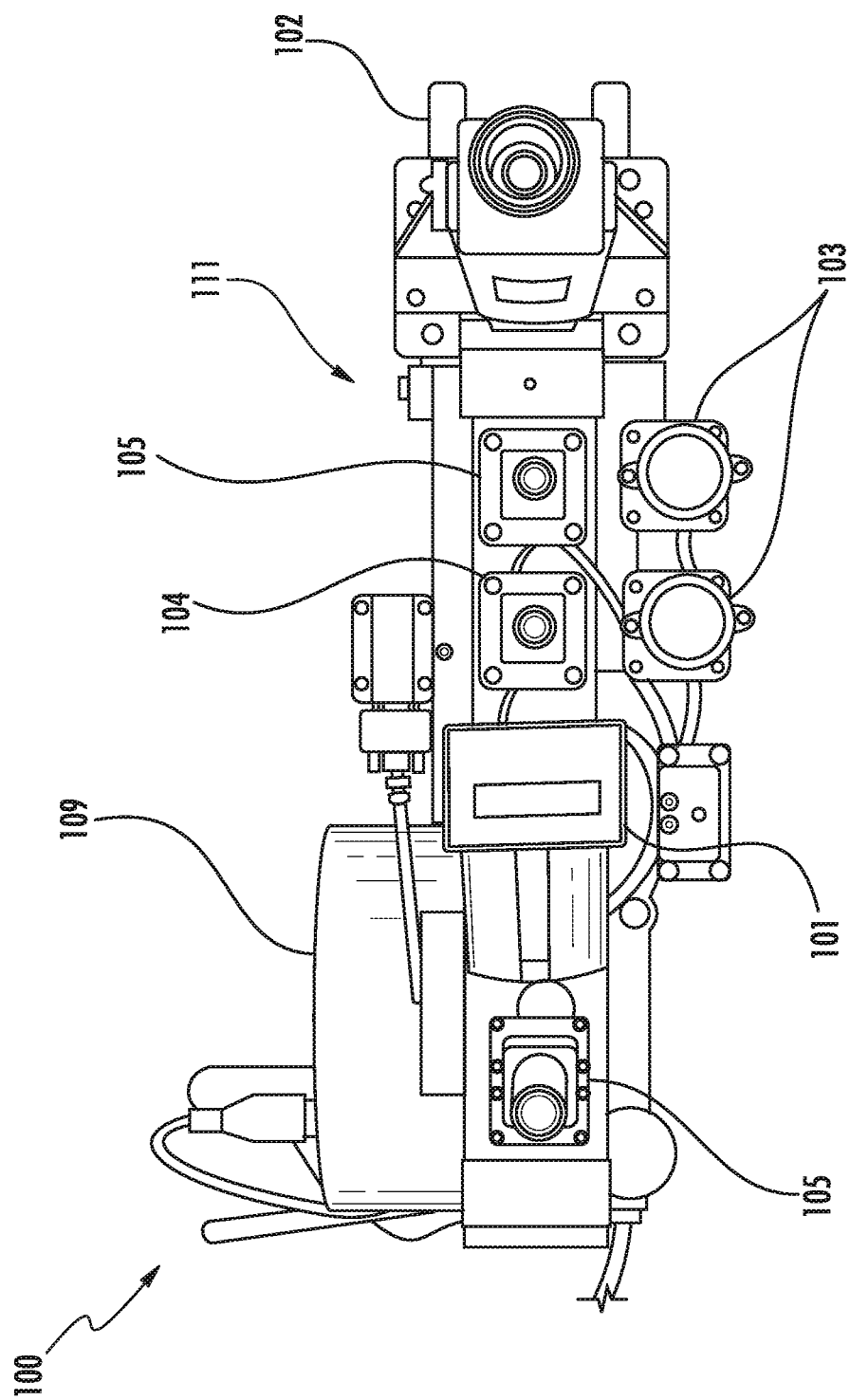
FIGS. 1a and 1b are top and side views, respectively, of a lightweight, low-cost, portable, compact, and self-contained multi-spectral 3-D imaging sensor suite designed for precision agriculture according to an embodiment of the presently disclosed subject matter.
Figure 1B:
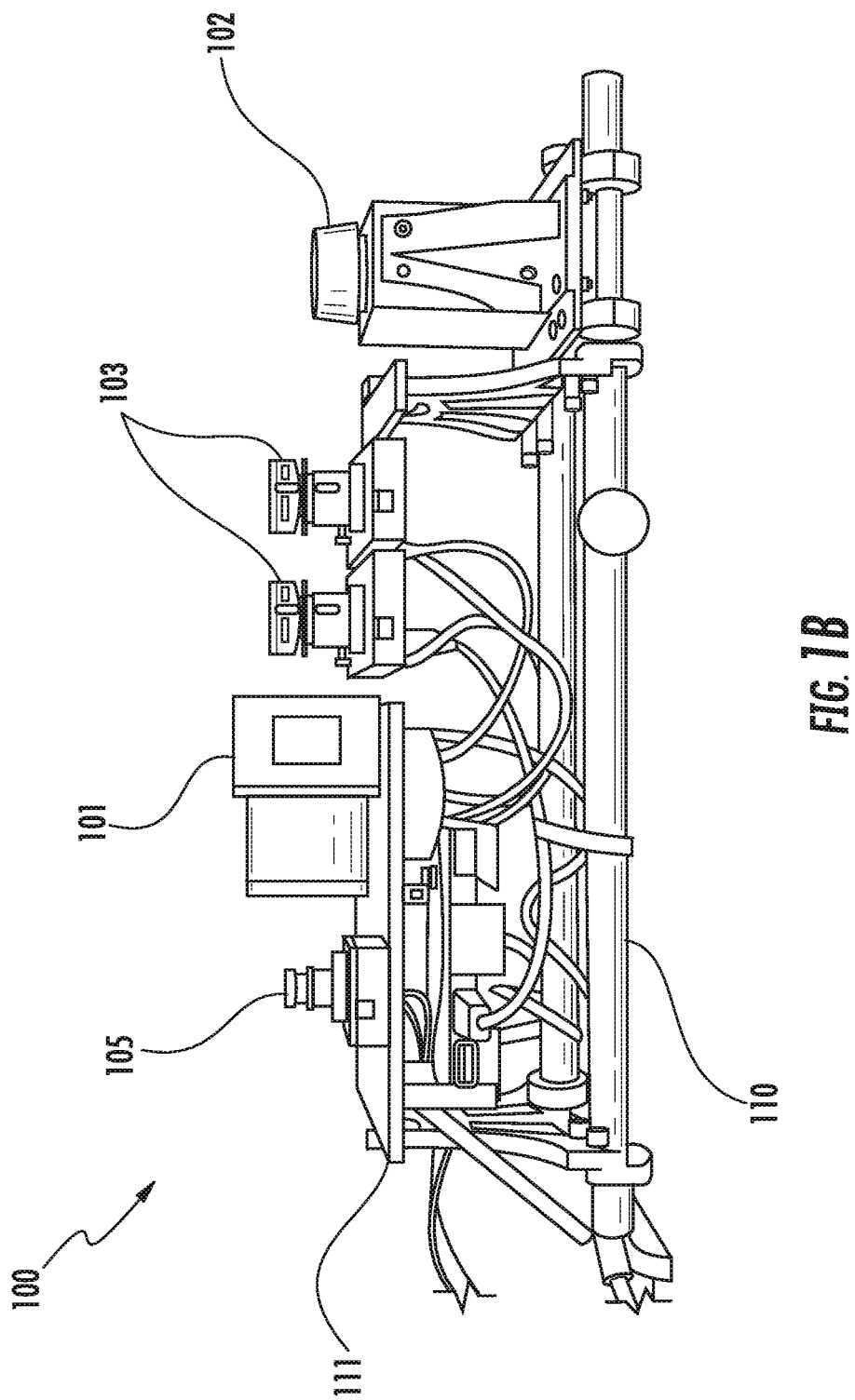

In this regard, the present subject matter provides systems, devices, and methods for data-driven precision agriculture through close-range remote sensing with a versatile imaging system. In one aspect, the present subject matter provides a compact multi-spectral 3-D imaging system. As discussed above, in recent years, there has been a growing interest in the use of imaging sensors for monitoring plant physiology and morphology. Accordingly, referring to one embodiment illustrated in FIGS. 1a and 1b, a sensor system, generally designated 100, may comprise an array of science sensors, navigation sensors, an onboard computer, a wireless communication link, and/or batteries. In this way, sensor system 100 according to the present subject matter may combine different sensing modalities on a self-contained, lightweight, and compact platform that can be implemented using any of a variety of deployment modalities. In particular, for example, the sensors onboard may be selected to monitor a range of plant physiological and morphological properties such as canopy volume, leaf area, water stress, and crop yield (e.g., fruit count, fruit size).

Specifically, for example, in some embodiments, sensor system 100 may include one or more laser range (e.g., LiDAR) scanners 101, which may be configured to extract morphological properties (e.g., canopy volume and leaf area) of the agricultural subject. In one particular configuration, for example, LiDAR scanner 101 may be a Hokuyo UST-20LX laser scanner, which may provide high-resolution laser scans for monitoring plant morphology.

Furthermore, in some embodiments, sensor system 100 may comprise one or more thermal cameras 102 and/or one or more multi-spectral cameras 103 configured to provide imaging in the red and near-infrared bands. Imagery from such bands may be used to monitor plant vigor, which may in turn be used in guiding pruning management and fertilization. In addition, thermal cameras 102 and multi-spectral cameras 103 may be used together to estimate a range of plant properties related to photosynthetic efficiency and water stress. In one particular configuration, for example, thermal camera 102 may be a FLIR A35 thermal imaging camera, which may be used to collect temperature readings (e.g., at a resolution of 320×256). Multi-spectral cameras 103 may include two monochrome Matrix Vision BlueFox cameras equipped with narrow-pass filters (e.g., at about 670 nm and 800 nm), which may together provide the necessary bands for calculation of the Normalized Difference Vegetation Index (NDVI)—an indicator of plant vigor. In addition, sensor system 100 may further include an RGB camera 104 (e.g., an RGB BlueFox camera) to acquire true-color data. Data from the wide range of spectral bands may be used for fruit-counting and monitoring crop stress and disease.

In addition, in some embodiments, sensor system 100 may include one or more of stereo camera rig 105 for visual odometry and reconstruction and/or a spectrometer 106. One or more navigational sensors 107 (e.g., global positioning system (GPS) sensor or other navigational sensors) may be included in sensor system 100 to determine the location in geographic space. In some embodiments, for example, navigational sensors 107 may include a Microstrain 3DM-GX4-25 IMU, a μBlox precise point positioning (PPP) GPS sensor, and/or two single-channel BlueFox cameras for stereo visual odometry.

Further, in some embodiments, sensor system 100 may include an inertial measurement unit (IMU) 108. As used herein, the term inertial measurement unit (IMU) should be understood to include a sensor that measures linear accelerations and angular velocities in three dimensions. In addition, barometric pressure sensors and magnetic field sensors may further be included in IMU 108, although these may alternatively be provided as independent sensors (i.e., a barometer and/or magnetometer).

An onboard computer 109 (e.g., Intel core i5 computer) may be used to log data from all the sensors and to facilitate communication to a base-station or the deployment vehicle (e.g., through a wi-fi link). Power may be delivered by one or more batteries (e.g., two 2700 mAh lithium polymer batteries).

Regardless of the particular components carried or their configuration, sensor system 100 may be configured to be relatively light (e.g., having a total weight of 1.6 kg or less) and compact (e.g., having dimensions of about 40 cm×13 cm×13 cm). It may further include a strong but lightweight frame 110 (e.g., a carbon fiber frame) that supports a base plate 111 (e.g., a polycarbonate plate) on which all sensors are mounted. This sensor arrangement may provide reliable operation in different deployment modes. Specifically, for example, an endurance of about an hour has been observed during the deployments.

Since the disclosed array of sensors may provide a platform for performing detailed and highly accurate environmental reconstruction, in some embodiments, it may be desirable that both the state estimation and scientific sensors be properly calibrated. For example, prior to each deployment, a complete system calibration may be performed, wherein the stereo camera rig 105 and the sensing cameras (e.g., thermal camera 102, multi-spectral camera 103, and/or RGB camera 104) are calibrated relative to IMU 108. This process may include both camera-system calibration (e.g., stereo, color, and multispectral) and spatial/temporal calibration of the respective cameras and IMU 108.

In addition, the intrinsic and extrinsic parameters of thermal camera 102 may be calibrated relative to stereo camera rig 105. This procedure can be complicated by the fact that thermal camera 102 cannot observe visible wavelengths, and produces only a low-resolution image (e.g., 320×256). Thus a standard chessboard pattern may not be available to be used to calibrate thermal camera 102 directly. In order to address this problem, an ordinary circle grid pattern printed on paper may be illuminated by a hot lamp, producing a pattern which is discernible in both the long-wave IR and optical regions of the spectrum. This approach allows for calibration of thermal camera 102 itself as well as with other cameras without introducing any complicated calibration device.

Regardless of the particular configuration of sensor system 100, the present subject matter may be deployed as a distributed plurality of sensor arrays. For example, the system may be mounted onboard one or more UAVs, generally designated 200, for rapid sensing in unstructured farmlands. As used herein, the term unmanned aerial vehicle (UAV) is understood to include an aerial platform that may be controlled remotely by a human or with onboard computers, and which may be capable of carrying payloads. UAVs 200 are well-suited for precision agriculture due to their small size, superior mobility, and hover capability, which allows them to perform both high-altitude remote sensing and close inspection (e.g., at distances less than 2 m) of problematic areas. In this regard, it has been successfully demonstrated that UAVs 200 equipped with multiple sensors are able to navigate autonomously through complex indoor and outdoor environments. Because of this combination of flight capability and maneuverability, such UAVs 200 may be advantageously applied to precision agriculture to produce both aerial views and side views (e.g., between rows of crops rather than just above them) of the subject agricultural area. This ability to collect data from multiple perspectives allows for complex modeling of the farmlands with high resolution and without large, intrusive, expensive, and/or overly complex data collection systems.

Figure 2:
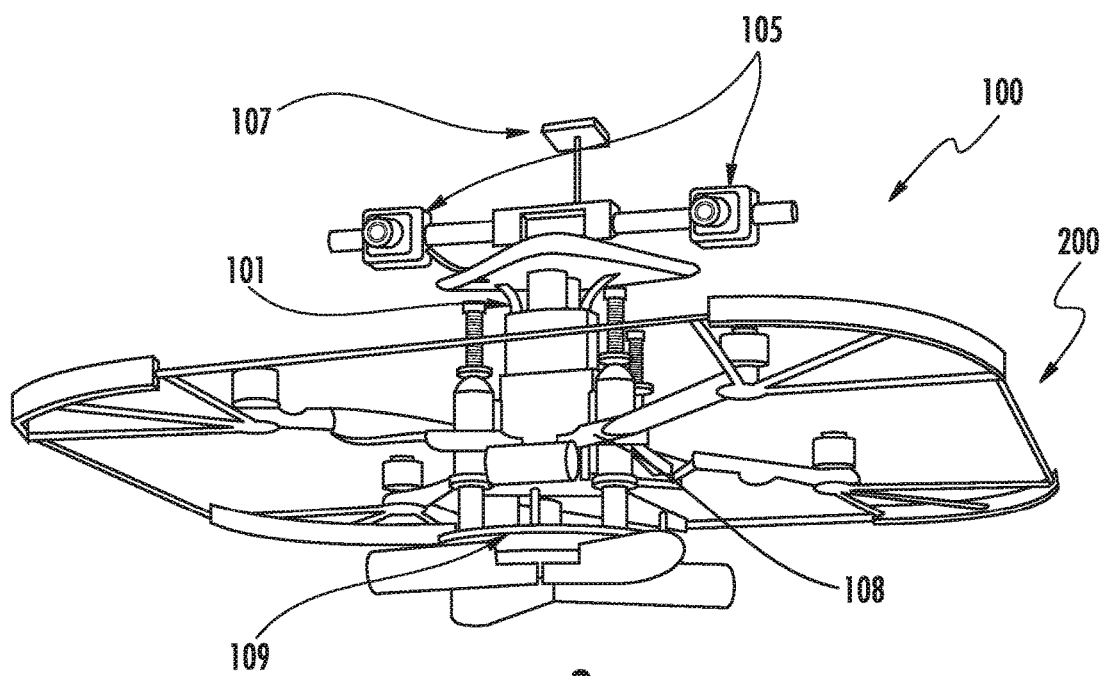
FIG. 2 is a perspective view of a UAV for precision agriculture according to an embodiment of the presently disclosed subject matter.

Accordingly, multiple UAVs 200 may be deployed with sensor system 100 onboard to acquire richer data. Specifically, for example, multiple UAVs 200 may be used to collect data from different parts of the farm, or from different angles, and the fused data may be used to generate 3-D maps with larger spatial coverage. Exemplary UAVs 200 used with the present subject matter may be configured to be lightweight (e.g., about 10 lbs. or less) yet capable of carrying a modest payload (e.g., about 4 lbs. or more) that includes the array of sensors and onboard control systems discussed above with respect to sensor system 100. FIG. 2 shows one generation of such vehicles with heterogeneous sensor modalities and constrained onboard computation power, including onboard navigational sensors, cameras, a laser scanner, and a computer. Multiple such low-cost and small UAVs 200 may be deployed in a farm for rapid tree mapping.

Figure 3A:
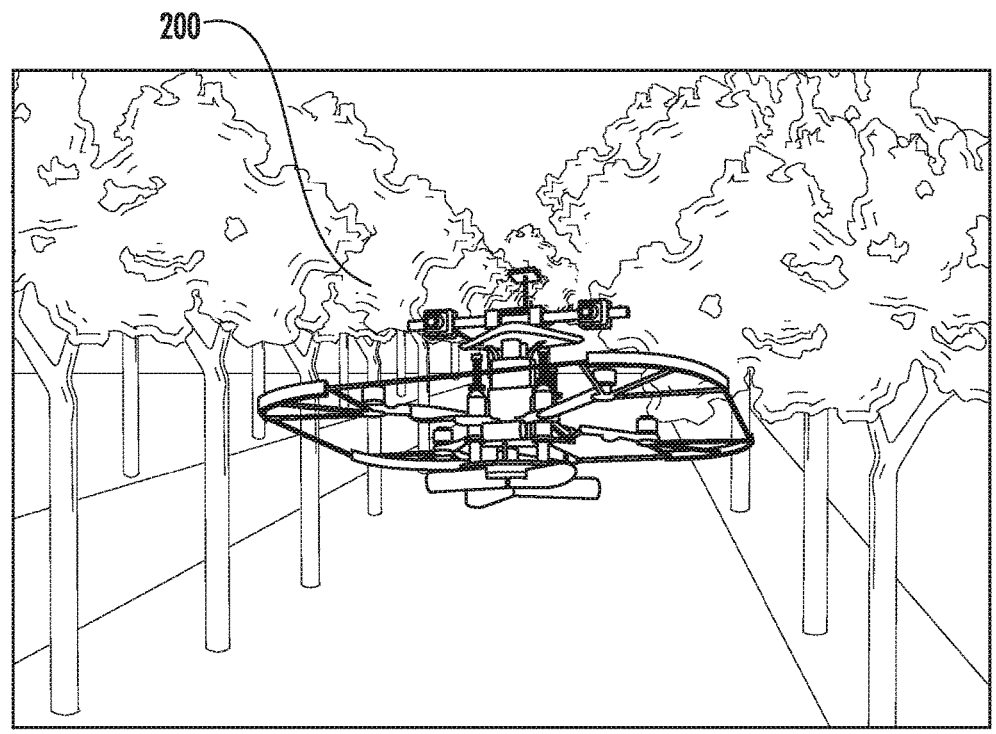
FIG. 3a is a perspective view of a UAV in-flight at a vineyard according to an embodiment of the presently disclosed subject matter.
Figure 3B:
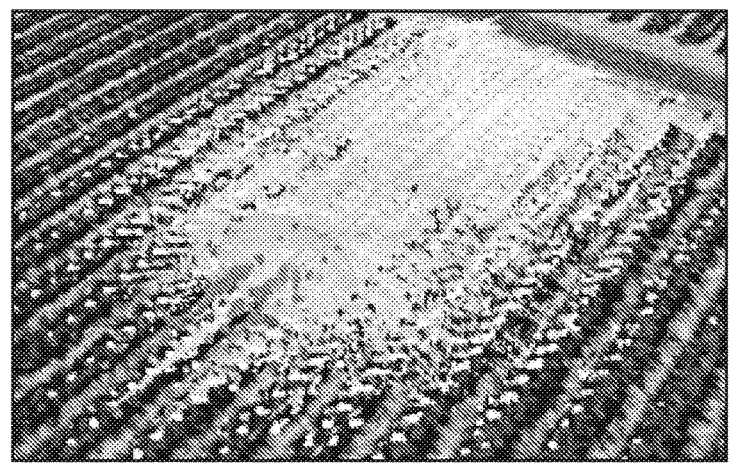
FIG. 3b is a real-time 3-D map of the rows of grape trees imaged by the UAV shown in FIG. 2.
Figure 4A:
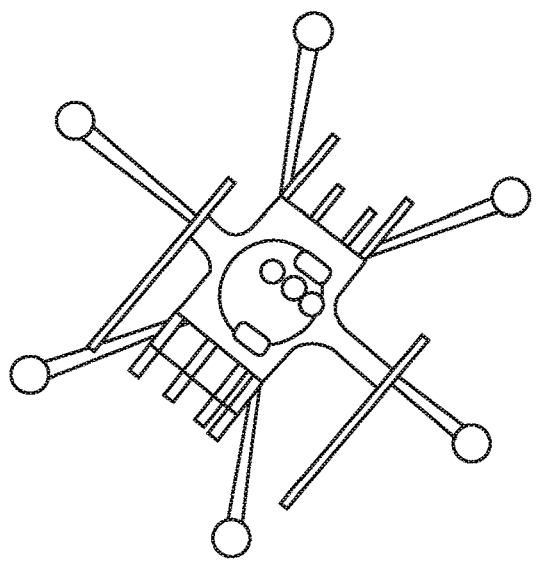
Figure 4B:
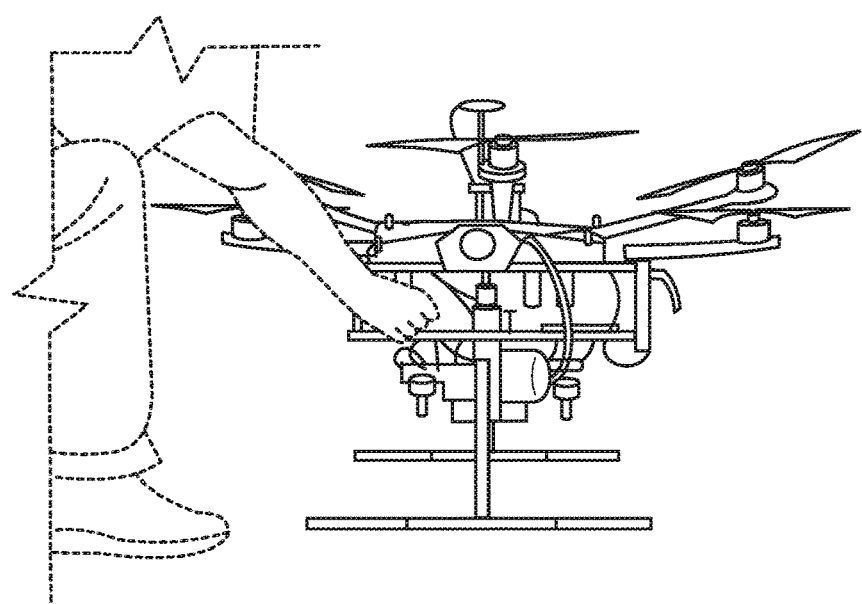

To exhibit the effectiveness of the disclosed systems and methods, several field experiments were conducted at a vineyard in Galt, Calif., where a UAV 200 navigated itself around the environment, and a 3-D map of vines was reconstructed and visualized in real-time (See, FIGS. 3a and 3b). FIGS. 4a through 4c show sensor system 100 being autonomously flown above the test vineyard. Results from the experiments at this vineyard are presented in FIGS. 6a and 6b.

Alternatively or in addition, the present systems and methods may similarly be implemented using ground-based deployment systems 300, such as on unmanned ground vehicles (UGVs), on manned vehicles (e.g. a scout truck), or in a wearable or hand-held configuration of sensor system 100 provided on a human scout since human scouts periodically carry out inspections of farms. In particular, with respect to a configuration of ground deployment system 300 using human scouts, the present systems and methods may be deployed on a mechanically stabilized harness 310 that may be carried by such scouts. Mechanical stabilization improves the quality of the recorded data, resulting in higher precision of 3-D reconstruction. Being lightweight and self-contained, no additional setup is necessary for the human scout to walk around with sensor system 100 carried on harness 310 to him as demonstrated in FIGS. 4d and 4e. In some embodiments, a visualization device (e.g., a display attached to harness 310 or a wearable display provided with the scout, such as augmented reality (AR) goggles or the like) may provide the scout with real time reconstructed maps and other information for situational awareness.

Regardless of the particular implementation, ground-based deployment systems 300 may be used to acquire data of side views of trees. In certain scenarios, the data acquired by such ground-based deployment systems 300 may be used to aid the planning of flights by UAVs 200 or further ground-based data collection. In this way, multiple deployment mechanisms may be used in cooperation to generate the high-resolution 3-D model of the subject agricultural area.

Figure 5:
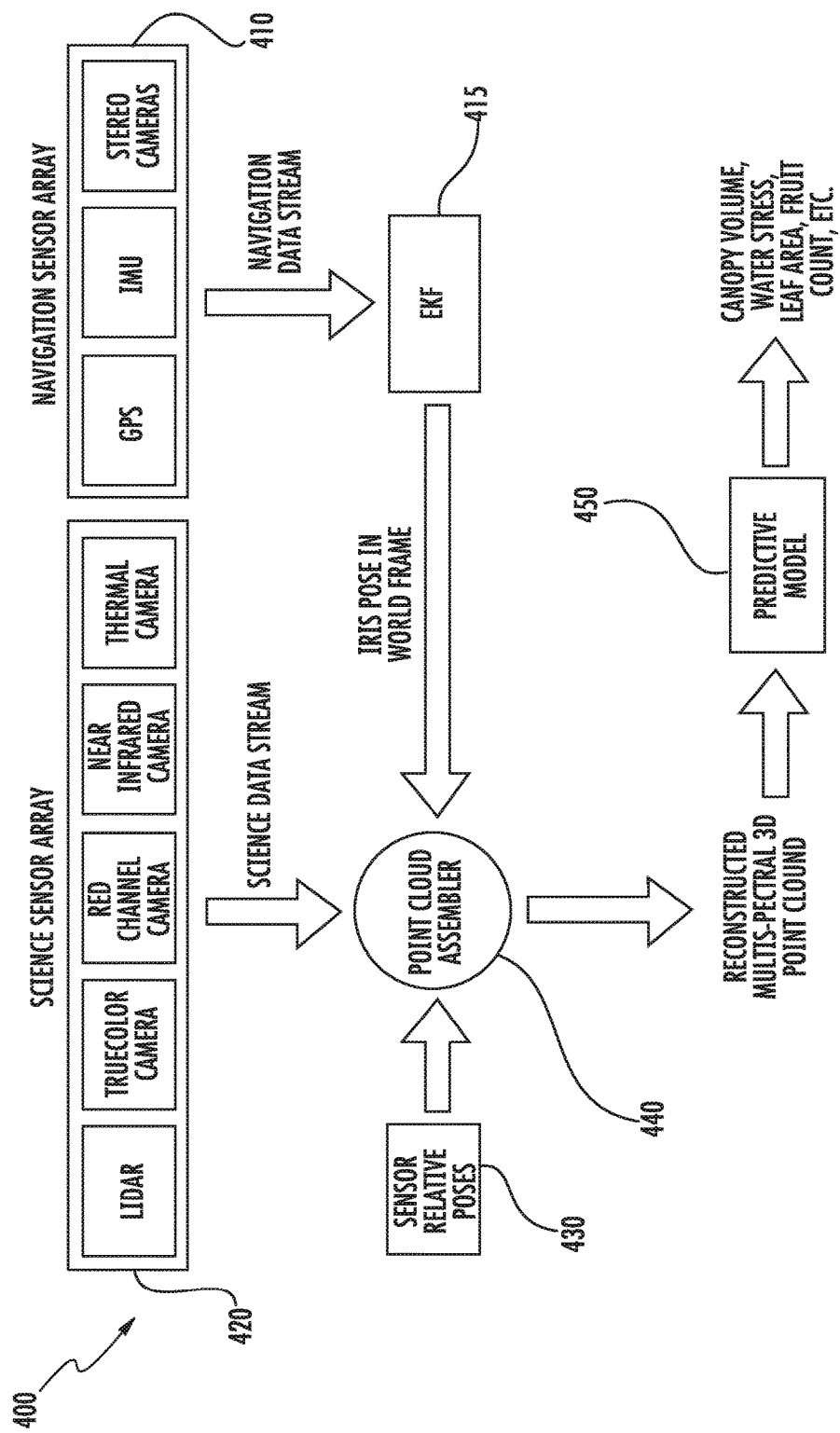
FIG. 5 is a flow chart illustrating a data processing pipeline of the system according to an embodiment of the presently disclosed subject matter.

The data acquired by sensor systems 100 discussed above may be processed in multiple stages. FIG. 5 shows an exemplary data processing pipeline, generally designated 400, of the present systems and methods. A middleware platform for robotic systems, such as the Robot Operating System (ROS), may form the backbone of data processing pipeline 400, facilitating sensor data logging and sharing of information between various processing nodes. State-estimation and mapping algorithms may be used to generate high-resolution multi-spectral 3-D maps, from which actionable intelligence such as fruit count, fruit size, trunk size, and canopy volume may be extracted using statistical machine learning techniques.

In some embodiments, for example, data processing pipeline 400 includes the generation of navigation data by a navigation sensor array 410 (e.g., navigational sensor 107, IMU 108, and stereo camera rig 105). A mathematical model may be used to estimate the location of the robot(s) (i.e., to determine the geographic location of a robot or sensor package with high accuracy). In some embodiments, for example, the data from the navigation sensor array 410 may be used by a state estimator 415 (e.g., an extended Kalman filter (EKF)) to generate pose estimates for every science sensor on the platform. For example, the error-state formulation of the EKF may be employed. Further inputs are provided from a science sensor array 420 and a pose memory 430 that stores information regarding sensor relative poses. A point cloud assembler 440 may use the pose estimates received from state estimator 415, the science data from science sensor array 420, and the known relative poses between sensors from pose memory 430 to reconstruct a multi-spectral 3-D point cloud (i.e., a representation format for 3-D data of an environment). The point clouds may also be converted to an octree representation for efficient storage and analysis.

Furthermore, the reconstructed multi-spectral point cloud may be input to a predictive model 450 to extract useful, actionable information from the point cloud. In this regard, machine learning techniques may include a set of techniques to determine trends in data and to learn models for predicting properties of interest from observed data correlated to the desired properties of interest (e.g., crop yield, stress, or disease). This includes techniques for dimensionality reduction, unsupervised learning, and supervised learning.

In addition, the present systems and methods may be used for simultaneous localization and mapping (SLAM), wherein an unknown environment is explored, the location of the robot with respect to the environment is determined, and a map of the environment is build simultaneously. SLAM may be performed in 2-D or 3-D depending on the sensors used.

In some embodiments, the sensing modalities of the sensor suite are selected to monitor a range of plant physiological and morphological properties, and actionable intelligence can be extracted from the data acquired by the system. Specifically, with respect to farm management, four examples of data products that may be obtained using the systems and methods discussed above include reconstructing plant morphology, computation of plant vigor, estimation of leaf area, and automated fruit counting or yield estimation using remotely sensed data. Plant vigor, measured through NDVI, facilitates decision-making for fertilization. Accurate estimation of leaf area has the potential to improve pruning and spraying management. The capability to estimate yield accurately will enable growers to plan labor for harvesting and storage for harvested fruits, both of which may be facilitated by predictive models that use the acquired data to estimate a property of interest (i.e., leaf area or fruit count).

Figure 6A:
FIG. 6a is a 3-D reconstruction of a row of grape trees spanning about 70 meters at a vineyard according to an embodiment of the presently disclosed subject matter.
Figure 6B:
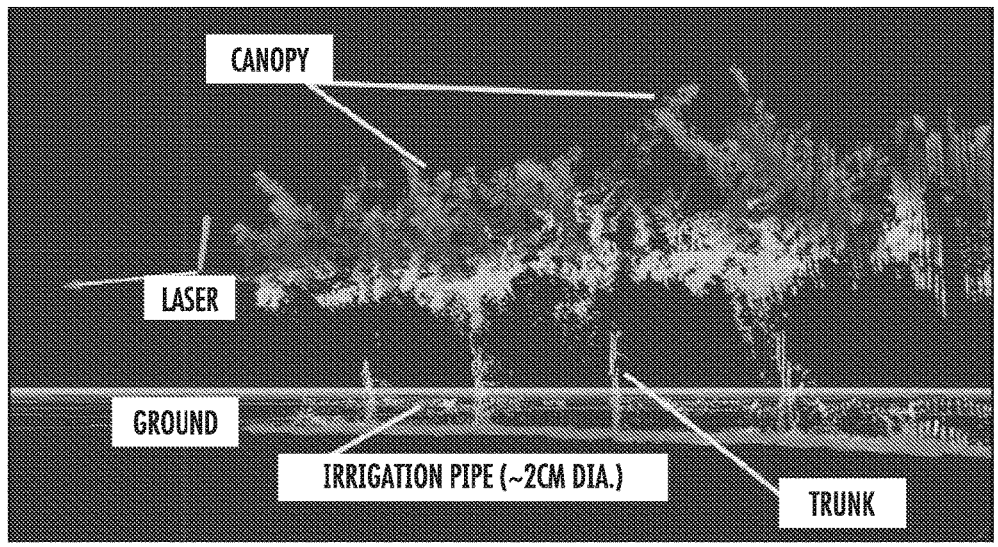

In particular, with respect to plant morphology, FIGS. 6a and 6b show a reconstructed point cloud of a row of grape trees from a sample vineyard. In FIG. 6b, features of the environment (e.g., the canopy, trunk, ground) have been highlighted. In these images, data was collected with sensor system 100 facing the side of the grape trees.

Figure 7A:
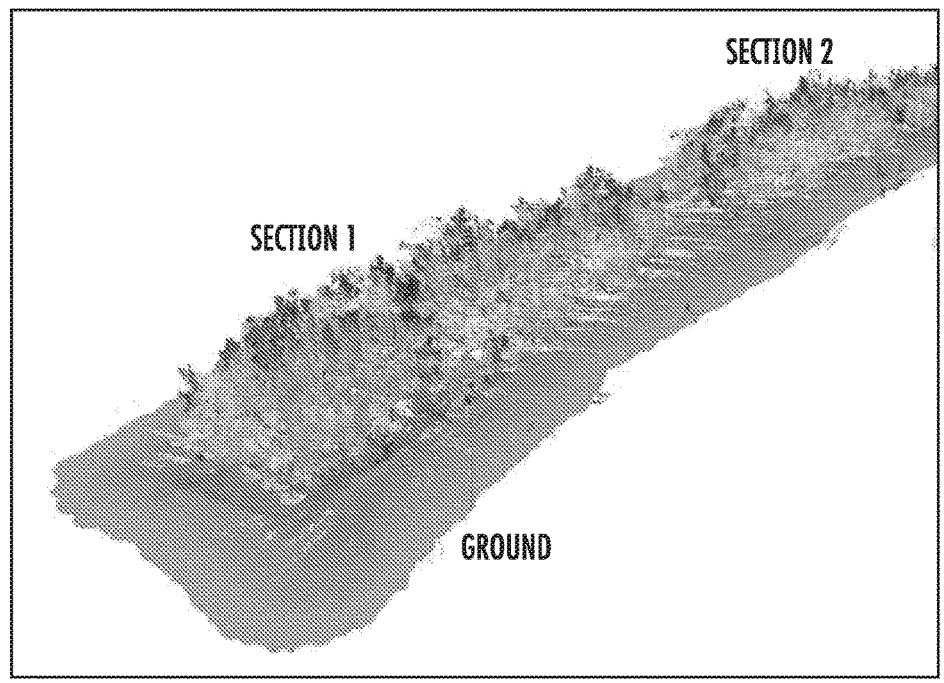
FIG. 7a is a multi-spectral 3-D reconstruction of a row of dwarf apple trees just using laser data according to an embodiment of the presently disclosed subject matter.
Figure 7B:
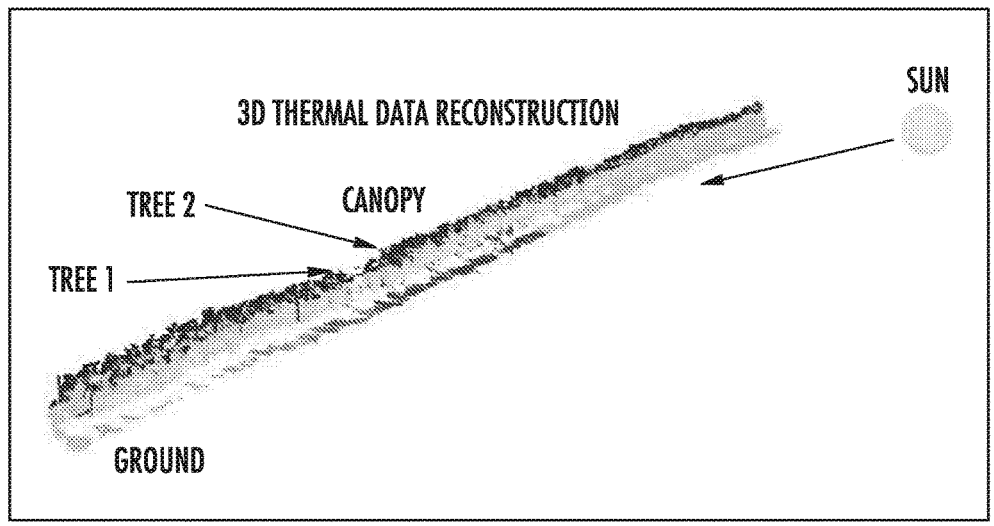
FIG. 7b is a multi-spectral 3-D reconstruction of a row of dwarf apple trees with thermal data overlaid on a 3-D point cloud according to an embodiment of the presently disclosed subject matter.

Similarly, FIGS. 7a-9d show example data products obtained from a 3-D reconstruction of scans of a row of semi-dwarf apple trees across two trials. In particular, FIG. 7a illustrates a multi-spectral 3-D reconstruction of a row of dwarf apple trees just using laser data, and FIG. 7b illustrates a multi-spectral 3-D reconstruction of a row of dwarf apple trees with thermal data overlaid on a 3-D point cloud. The data was acquired in the afternoon, with the direction of the trees facing the sun showing higher canopy temperature (blue is cooler, red is warmer).

In addition, regarding plant vigor, in some embodiments, NDVI may be computed using multi-spectral imagery acquired by sensor system 100. For pixel data corresponding to a multi-spectral image, NDVI=(NIR−VIS)/(NIR+VIS), where NIR=800 nm (i.e., near-infrared) and VIS=670 nm (i.e., visible). An NDVI map may then be generated using multispectral data acquired by sensor system 100 (e.g., onboard UAV 200). These maps enable growers to plan fertilization and mitigation in response to stresses observed in the NDVI imagery.

Figure 8A:
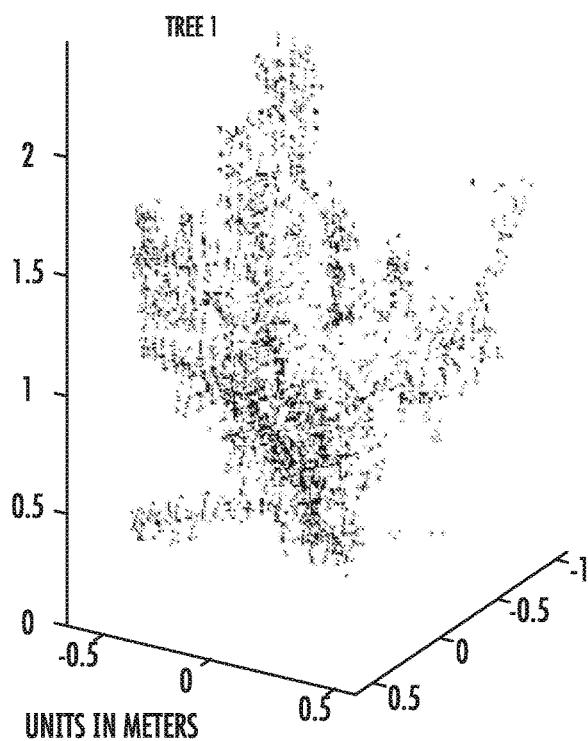
FIGS. 8a through 8d are 3-D point clouds of canopies that may be used to determine tree height, canopy volume, and leaf area according to an embodiment of the presently disclosed subject matter.
Figure 8B:
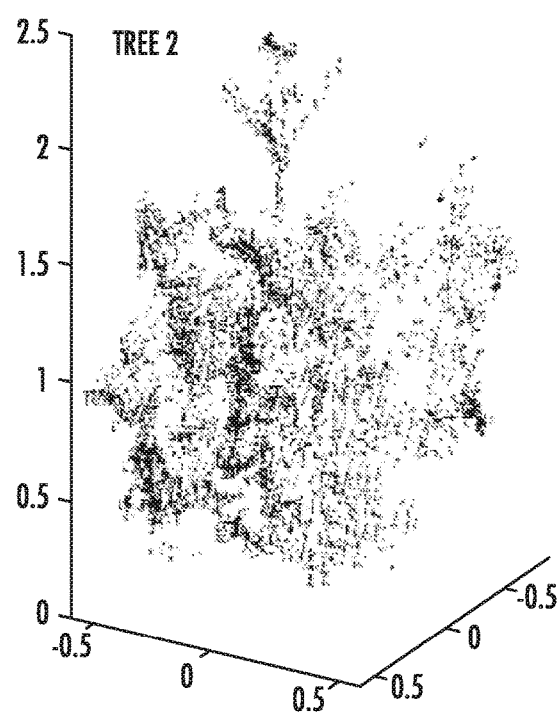
Figure 8C:
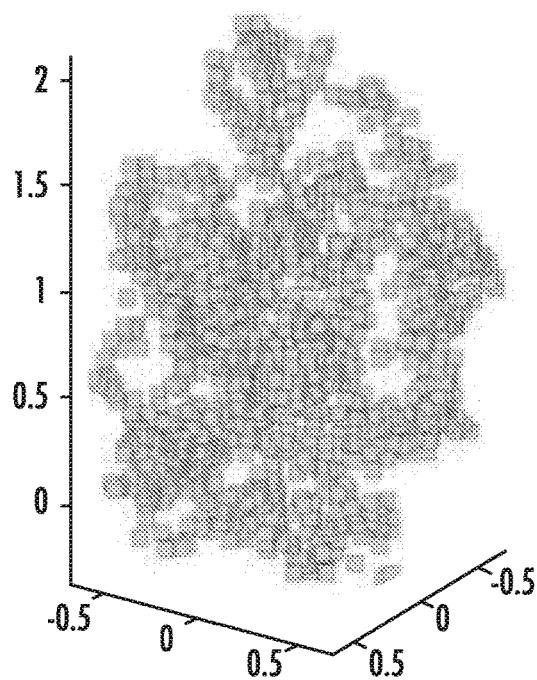
Figure 8D:
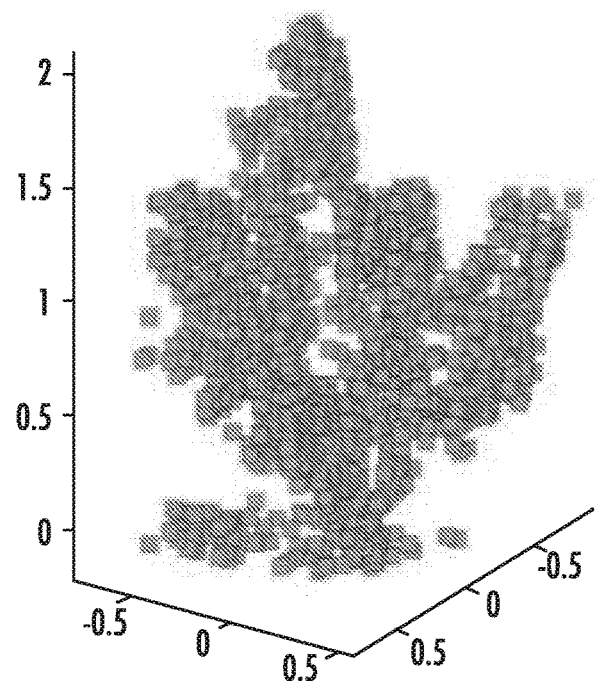
Figure 9:
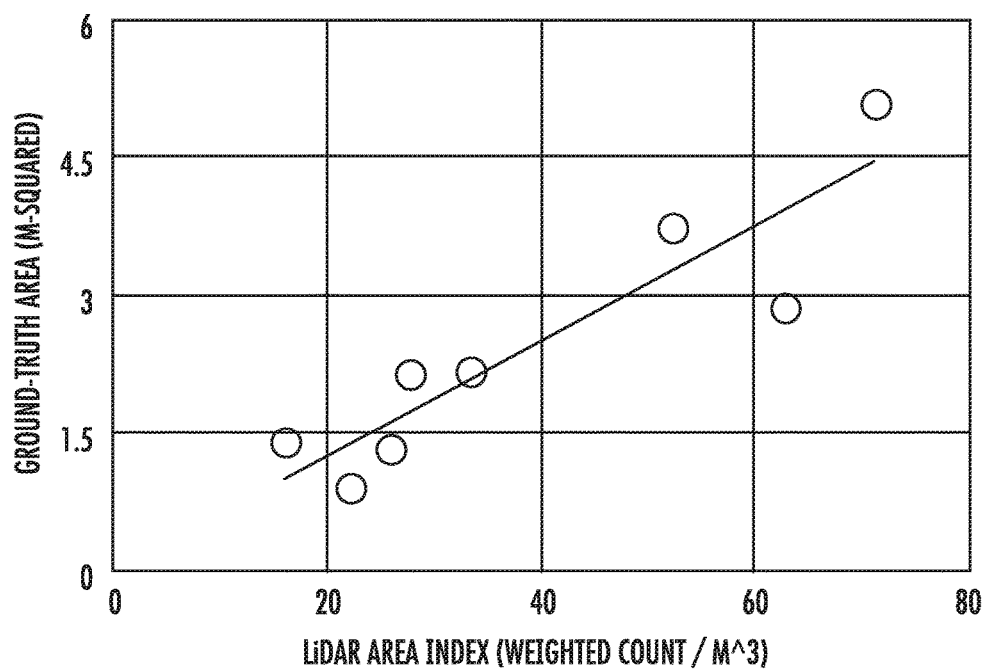
FIG. 9 is a graph illustrating a Correlation between LiDAR area index and measured true leaf area for the data points corresponding to the emulated canopy stages of two trees according to an embodiment of the presently disclosed subject matter.

Regarding leaf area estimation, estimation of the total leaf area of a plant may help guide the management of fertilization, pruning, and spraying. In some embodiments, for example, the data from sensor system 100 is used to obtain accurate leaf area for target trees. FIGS. 8a-8d illustrate 3-D point clouds of canopies that may be used to determine tree height, canopy volume, and leaf area. In particular, FIGS. 8a and 8b show 3-D reconstructions of two apple trees from an orchard in Biglerville, Pa. FIGS. 8c and 8d show the representation of the trees in a format called 'octree' that makes analysis and storage simpler. Here, an occupied voxel has an occupancy probability greater than 0.5, and volume of the tree was taken to be the bounding box of all occupied voxels. Weighting of the voxels was done using the occupancy probability. This metric may be referred to as the LiDAR area index. FIG. 9 shows the correlation between the LiDAR area index and the true leaf area for each of the data points. This choice of input feature (i.e. LiDAR area index) shows a strong correlation, with an R-squared value of 0.82. The result demonstrates the use of sensor system 100 in estimation of leaf area for rows of trees. In this way, the leaf area estimation methodology may be used to rapidly estimate the leaf area of trees in a farm, enabling precise fertilization, spraying, and pruning.

Finally, accurate automated fruit counting can enable growers to determine storage and labor needs prior to harvest. Accordingly, in some embodiments, data acquired from sensor system 100 may be used to generate fruit count to provide this capability. In particular, the present systems and methods may be used with an algorithm to generate fruit counts for the rows of trees using the data acquired by sensor system 100. Although discussed hereinbelow in the context of counting oranges, those having skill in the art will recognize that the present approach may be extended to counting of other fruits such as apples, peaches, as well as clustered fruits such as grapes and blueberries.

In some embodiments, a fruit counting approach consists of two steps: fruit detection followed by fruit tracking. First, fruit detection is carried using a support vector machine (SVM) classifier that uses different color spaces to classify each pixel in an image as originating from a fruit or not. A series of images were labeled to annotate regions that have a fruit enclosed (e.g., an orange in a use case involving an orange orchard). The training dataset of images were used to train the SVM classier with candidate pixel colorspace values as input. In some embodiments, for estimating fruit yield from farms, a running count is generated as sensor system 100 carries out scans of trees. To do so, a fruit tracking algorithm may be used to track fruits detected in a stream of images. To keep track of fruits that have already been detected in previous frames, the optical flow of image descriptors may be computed across successive frames to estimate camera motion. The fruit tracking algorithm uses the estimated camera motion between frames to predict the locations of fruits detected in previous frames. These detections are compared with fruits detected in current frame to ensure previously detected fruits are not recounted.

Figures 10A, 10B:
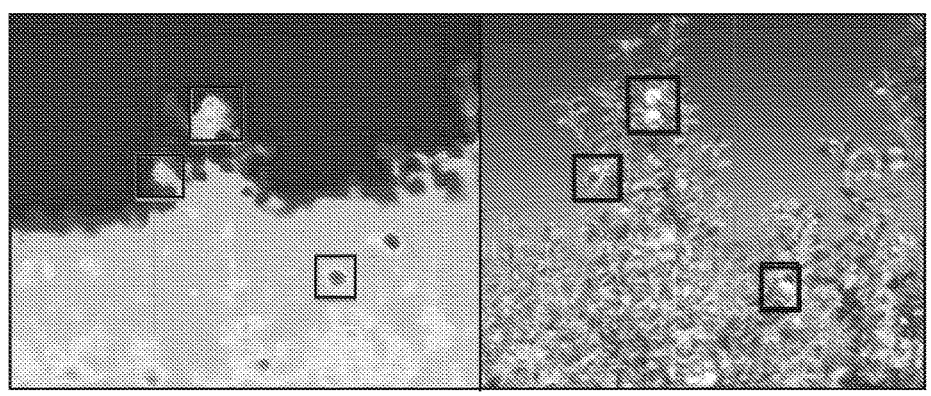
FIGS. 10a and 10b illustrate data from a thermal camera along with data from visible-range cameras according to an embodiment of the presently disclosed subject matter.

A limitation of such an automated fruit counting algorithm is its dependence on suitable illumination. For example, fruit detection quality is poor when the sun faces the camera. Additionally, color based fruit classifiers are susceptible to false positives due to canopy features that sometimes match fruit features. For example, detection and counting of green oranges is challenging due to the color similarities with canopy. To address this issue, thermal imagery may be sued along with visible camera data to exploit the temperature differential between fruits and canopy in order to improve detection accuracy. FIGS. 10a and 10b illustrate data from thermal camera along with data from visible-range cameras that make detection of fruits efficient under appropriate conditions. Image processing algorithms are used to detect fruits and generate a running count as the sensor suite is deployed onboard UAVs or carried by a human scout.

The present subject matter is different from prior work in systems and methods for monitoring agricultural products (e.g., U.S. Patent Application Pub. No. 2013/0325346) in at least the following aspects. Compared to existing technologies, the present sensing system can be achieved at low-cost (e.g., about $10 k or less), and it can be lightweight (e.g., about 4 lbs. or less), portable, compact (e.g., size of a show box), and self-contained (e.g., comes with onboard computing and batteries). In addition, it may be deployed in a distributed array, such as on affordable multi-rotor UAVs, including on a plurality of UAVs controlled as a swarm to collectively obtain the high-resolution 3-D imagery of a subject agricultural area. Alternatively or in addition, the present systems may be deployed by a human scout using a harness or by any of a variety of other mobile deployment device. Furthermore, the process for generating actionable intelligence may be addressed using machine learning techniques. Finally, the framework underlying the present subject matter considers data visualization as a valuable component of the technology stack.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A method for data-driven remote sensing for precision agriculture, the method comprising:
    obtaining high-resolution 3-D imagery using one or more mobile sensor arrays;
    applying state-estimation and mapping algorithms to the high-resolution 3-D imagery to generate high-resolution multi-spectral 3-D maps; and
    extracting actionable intelligence from the high-resolution multi-spectral 3-D maps.

2. The method of claim 1, wherein obtaining high-resolution 3-D imagery comprises obtaining both side views and aerial views of crops in a subject agricultural area.

3. The method of claim 1, wherein at least one of the one or more mobile sensor arrays are deployed on a low-flying unmanned aerial vehicle (UAV).

4. The method of claim 1, wherein at least one of the one or more mobile sensor arrays are carried by human scouts.

5. The method of claim 1, wherein obtaining the high-resolution 3-D imagery comprises obtaining multi-spectral 3-D data.

6. The method of claim 1, wherein obtaining the high-resolution 3-D imagery comprises simultaneously exploring an unknown environment, determining the locations of the plurality of mobile sensor arrays with respect to the environment, and building a map of the environment.

7. The method of claim 1, wherein extracting the actionable intelligence comprises applying statistical models to predict properties of interest such as crop yield, trunk size, canopy volume, water stress, and/or disease.

8. A system for performing data-driven remote sensing for precision agriculture comprising:
    a mobile deployment device;
    a multispectral 3-D imaging system coupled to the mobile deployment device, the multispectral 3-D imaging system comprising a science sensor array and a navigation sensor array, the imaging system being configured to obtain high-resolution 3-D imagery of a subject agricultural area; and
    a data visualization framework in communication with the science sensor array and the navigation sensor array, the data visualization framework being configured to apply state-estimation and mapping algorithms to the high-resolution 3-D imagery to generate high-resolution multi-spectral 3-D maps of the subject agricultural area.

9. The system of claim 8, wherein the science sensor array comprises one or more of a laser range scanner (LiDAR), one or more multi-spectral cameras spanning red and near-infrared bands, a thermal camera, and/or a spectrometer.

10. The system of claim 8, wherein the navigation sensor array comprises one or more stereo camera for visual odometry, a global positioning system (GPS) sensor or other navigational sensors, and/or an inertial measurement unit (IMU).

11. The system of claim 8, wherein the multispectral 3-D imaging system weighs less than 1.6 kg.

12. The system of claim 8, wherein the mobile deployment device comprises a low-flying unmanned aerial vehicle (UAV).

13. The system of claim 12, wherein the mobile deployment device comprises a plurality of low-flying UAVs operable in a swarming arrangement to collectively obtain the high-resolution 3-D imagery of the subject agricultural area.

14. The system of claim 8, wherein the mobile deployment device comprises a harness configured to be carried by human scouts.

15. The system of claim 8, wherein the data visualization framework comprises a comprehensive real-time and/or offline data visualization framework configured for efficient exploratory analysis of raw sensor data and derived data products obtained by the multispectral 3-D imaging system.

16. The system of claim 15, wherein the data visualization framework comprises:
    a state-estimator configured to estimate the pose of the multispectral 3-D imaging system based on a navigation data stream generated by the navigation sensor array during motion;
    a point-cloud assembler configured to generate a multi-spectral 3-D point cloud from the pose of the multi-spectral 3-D imaging system and a science data stream generated by the science sensor array; and
    a machine-learning model configured for extracting actionable intelligence from the multi-spectral 3-D point cloud to generate the high-resolution multi-spectral 3-D maps of the subject agricultural area.

17. The system of claim 8, wherein the data visualization framework is located remotely from the multispectral 3-D imaging system; and
    wherein the multispectral 3-D imaging system comprises a wireless communications link configured for communication with the data visualization framework.

* * * * *